US012753281B2

(12) United States Patent
Kyran

(10) Patent No.: US 12,753,281 B2
(45) Date of Patent: Oct. 6, 2026

(54) SYNTHESIS OF SELF-HEALING BENZOXAZINE POLYMERS THROUGH MELT POLYMERIZATION

(71) Applicant: KANEKA CORPORATION, Osaka (JP)

(72) Inventor: Samuel Kyran, Pasadena, TX (US)

(73) Assignee: KANEKA CORPORATION, Osaka (JP)

(*) Notice: Subject to any disclaimer, the term of this patent is extended or adjusted under 35 U.S.C. 154(b) by 686 days.

(21) Appl. No.: 18/026,929

(22) PCT Filed: Sep. 29, 2021

(86) PCT No.: PCT/IB2021/022219

§ 371 (c)(1),
(2) Date: Mar. 17, 2023

(87) PCT Pub. No.: WO2022/069947

PCT Pub. Date: Apr. 7, 2022

(65) Prior Publication Data

US 2024/0010794 A1 Jan. 11, 2024

Related U.S. Application Data

(60) Provisional application No. 63/085,115, filed on Sep. 29, 2020.

(51) Int. Cl.

*C08G 73/02* (2006.01)
*C08J 3/00* (2006.01)
*C08L 79/04* (2006.01)

(52) U.S. Cl.

CPC .......... *C08G 73/0233* (2013.01); *C08J 3/005* (2013.01); *C08L 79/04* (2013.01); *C08J 2379/04* (2013.01); *C08J 2463/00* (2013.01)

(58) Field of Classification Search

CPC .. C01B 25/455; C08G 59/4007; C08G 59/50; C08G 59/504; C08G 73/0233; C08K 5/17; C08L 63/00; C08L 79/02; C08L 79/04; H01M 10/052; H01M 10/0525; H01M 10/0567; H01M 10/0568; H01M 10/0569; H01M 2004/021; H01M 2300/0025; H01M 4/131; H01M 4/133; H01M 4/134; H01M 4/485; H01M 4/505; H01M 4/525; H01M 4/5825; H01M 4/587; H01M 10/00; H01M 10/05; Y02E 60/10

See application file for complete search history.

(56) References Cited

U.S. PATENT DOCUMENTS

2008/0257485 A1* 10/2008 Xie ........................ C09J 163/00 156/247
2015/0045528 A1* 2/2015 Gorodisher ............. C08L 79/04 528/96

FOREIGN PATENT DOCUMENTS

| | | | |
|---|---|---|---|
| ES | 2757824 | T3 * | 4/2020 |
| JP | 2008-231287 | A | 10/2008 |
| WO | 2008095850 | A1 | 8/2008 |
| WO | 2012134731 | A1 | 10/2012 |
| WO | 2013063236 | A1 | 5/2013 |

OTHER PUBLICATIONS

ES 2757824 T3 (Apr. 30, 2020) machine translation.*
Kiskan et al., "Polybenzoxazines as Self-Healing Materials", http;//dx.doi.org/10.1016/B978-0-12-804170-3.00047-0.*
Notice of Reasons for Refusal issued in corresponding Japanese Patent Application No. 2023-519447, mailed Apr. 23, 2024.
International Search Report issued in corresponding International Application No. PCT/IB2021/022219, mailed Dec. 7, 2021 (4 pages).
Written Opinion issued in corresponding International Application No. PCT/IB2021/022219, mailed Dec. 7, 2021 (4 pages).

* cited by examiner

*Primary Examiner* — Ana L. Woodward

(74) *Attorney, Agent, or Firm* — Osha Bergman Watanabe & Burton LLP

(57) ABSTRACT

A self-healing resin composition of a polymer formed from the reaction between a thermoplastic polymer having terminal functional groups and a benzoxazine compound is provided. Also provided is a method of forming such a self-healing resin composition. A method of self-healing an article is also provided. In such a method, an article may have a rupture, and may be formed from a polymer resulting from reaction between a thermoplastic polymer having terminal functional groups and a benzoxazine compound. The method may include maintaining the article formed from the polymer at a predetermined temperature for a predetermined time such that the rupture is repaired.

15 Claims, 3 Drawing Sheets

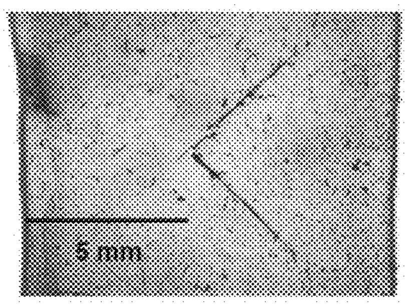
150 °C, 2 h
Partial healing
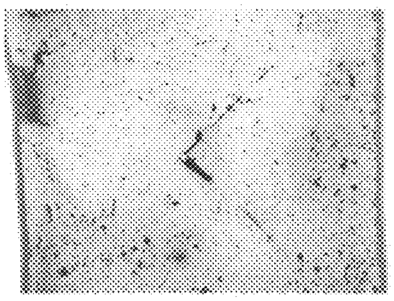
FIG. 3A
FIG. 3B
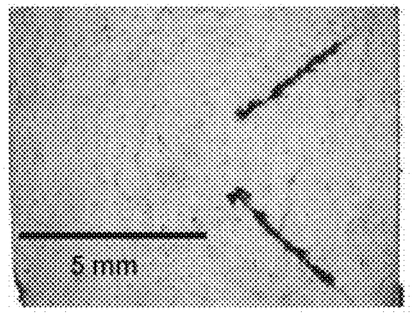
125 °C, 1 h
Near complete healing
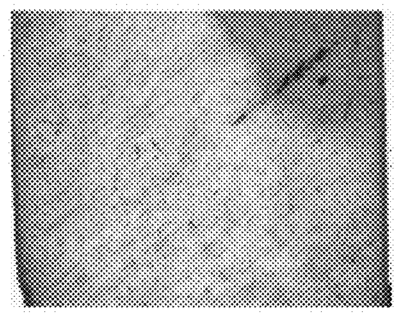
FIG. 4A
FIG. 4B
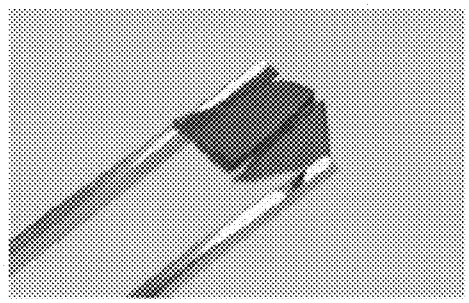
r.t., <5 days
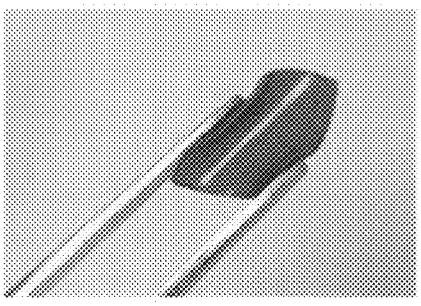
FIG. 5A
FIG. 5B

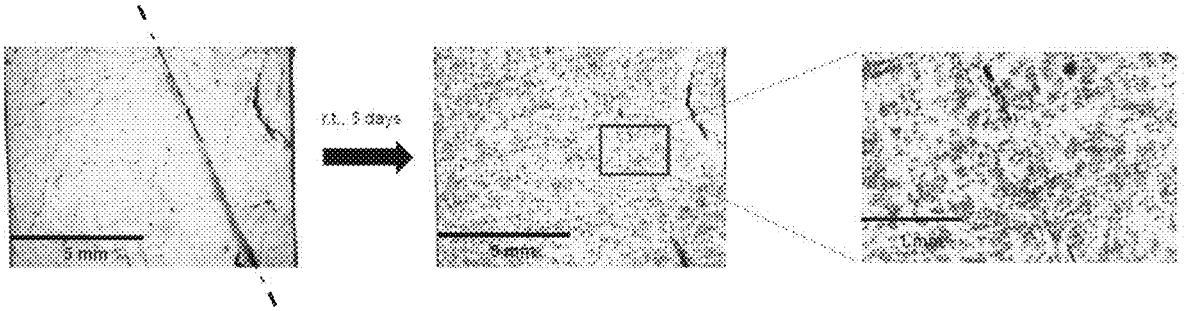
FIG. 6A FIG. 6B FIG. 6C
FIG. 7A
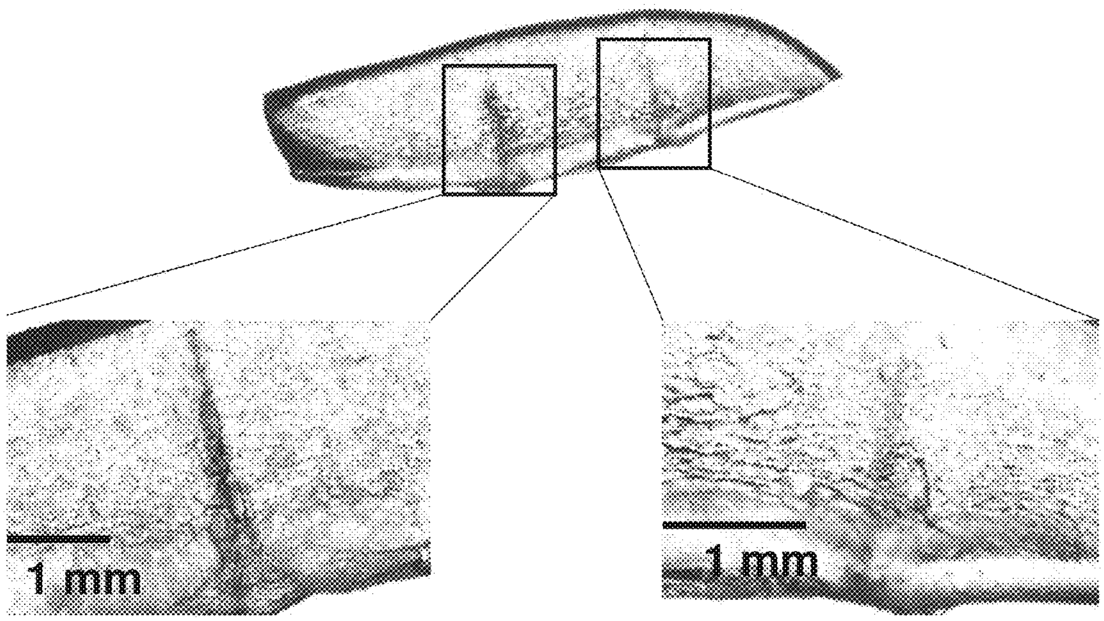
FIG. 7B FIG. 7C

SYNTHESIS OF SELF-HEALING BENZOXAZINE POLYMERS THROUGH MELT POLYMERIZATION

BACKGROUND

Self-healing polymers are commercially valuable materials because products composed of such materials can exhibit higher durability, longer life-span, and the ability to be repairable and/or recover from damage. Healing processes are generally classified as extrinsic (i.e., an external agent helps heal a damaged matrix) or intrinsic (i.e., healing is facilitated via molecular properties of the matrix itself), and exhibit either non-autonomous (i.e., requiring an external trigger such as heat to initiate healing) or autonomous (i.e., self-healing occurs without external triggers) modes.

Several healing approaches are known in the literature such as dispersion of microcapsules bearing reactive monomers within a polymer, dispersion of a flowable thermoplastic in a thermoset, a matrix with ability to undergo reversible chemical reactions, and polymers that exhibit supramolecular interactions. Applications can range across a variety of fields including scratch-recoverable surface coatings and crack repair in composites, electronics, aerospace components, and automotive parts.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a self-healing resin composition having a polymer formed from the reaction between a thermoplastic polymer having terminal functional groups and a benzoxazine compound, where the terminal functional groups are selected from the group consisting of primary amines, secondary amines, thiols, phenolic compounds, and combinations thereof.

In another aspect, embodiments disclosed herein relate to a method of forming a self-healing resin composition, the method including reacting a benzoxazine compound and a thermoplastic polymer having terminal functional groups by melt polymerization, where the terminal functional groups are selected from the group consisting of primary amines, secondary amines, thiols, phenolic compounds, and combinations thereof.

In yet another aspect, embodiments disclosed herein relate to a method of self-healing an article formed from a polymer resulting from reaction between a thermoplastic polymer having terminal functional groups and a benzoxazine compound, where the terminal functional groups are selected from the group consisting of primary amines, secondary amines, thiols, phenolic compounds, and combinations thereof. The article has a rupture, and the method includes maintaining the article formed from the polymer at a predetermined temperature for a predetermined time such that the rupture is repaired.

Other aspects and advantages of the claimed subject matter will be apparent from the following description and the appended claims.

BRIEF DESCRIPTION OF DRAWINGS

FIG. 3A is a photomacrograph of a polymer with cuts according to one or more embodiments of the present disclosure.

FIG. 3B is a photomacrograph of a polymer that has undergone self-healing according to one or more embodiments of the present disclosure.

FIG. 4A is a photomacrograph of a polymer with cuts according to one or more embodiments of the present disclosure.

FIG. 4B is a photomacrograph of a polymer that has undergone self-healing according to one or more embodiments of the present disclosure.

FIG. 5A is a photograph of a polymer with cuts according to one or more embodiments of the present disclosure.

FIG. 5B is a photograph of a polymer that has undergone self-healing according to one or more embodiments of the present disclosure.

FIG. 6A is a photomacrograph of a polymer with cuts according to one or more embodiments of the present disclosure.

FIG. 6B is a photomacrograph of a polymer that has undergone self-healing according to one or more embodiments of the present disclosure.

FIG. 6C is a photomacrograph of a polymer that has undergone self-healing according to one or more embodiments of the present disclosure.

FIG. 7A is a photomacrograph of a polymer with a cut according to one or more embodiments of the present disclosure.

FIG. 7B is a photomacrograph of a polymer that has undergone self-healing according to one or more embodiments of the present disclosure.

FIG. 7C is a photomacrograph of a polymer that has undergone self-healing according to one or more embodiments of the present disclosure.

DETAILED DESCRIPTION

Figure 1A:
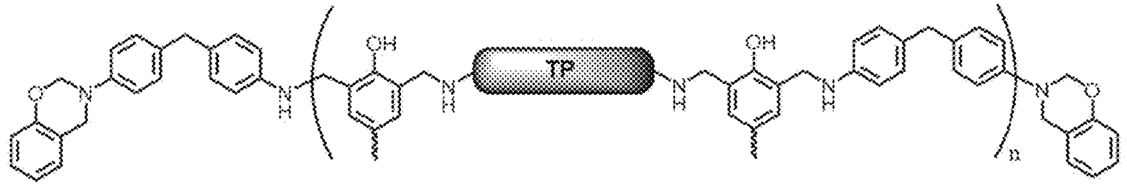
FIG. 1A is an exemplary self-healing resin according to one or more embodiments of the present disclosure.

Embodiments of the present disclosure generally relate to polymers having self-healing properties. The self-healing properties may be due at least in part to dynamic molecular mobility in the polymers, supramolecular interactions such as hydrogen bonding, and metal-ligand interactions. Such polymers may have self-healing properties at room temperature and elevated temperature conditions.

In one or more embodiments, self-healing resin compositions of the present disclosure may include a polymer formed from the reaction between a thermoplastic polymer having terminal functional groups and a benzoxazine (BZ) compound.

The thermoplastic polymer having terminal functional groups in accordance with one or more embodiments of the present disclosure is not particularly limited. In some embodiments, the thermoplastic polymer may be any suitable thermoplastic polymer, provided it has terminal functional groups for reacting with a BZ compound. The terminal functional groups may include primary amines, secondary amines, thiols, and/or phenolic compounds. As used herein, "phenolic compounds" include phenols and substituted phenols, where a substituted phenol is a phenol that includes an additional functional group such as a hydrocarbon group, a substituted hydrocarbon group, a hydroxyl group, or a functional group. The thermoplastic polymer may include a polymer backbone having amine, siloxane, ether, alkyl, and/or phenolic functionality. In some embodiments, the thermoplastic polymer, may be a polyether polymer, a polysiloxane polymer, or a polyalkyl polymer.

In some embodiments, the thermoplastic polymer may be a polyether having the structure represented by formula (I):

(I)

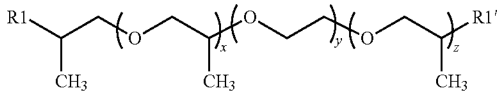

where y is from about 1 to 40 and x+z is from about 1 to 8. In some embodiments, y may have a lower limit of any of 1, 2, 5, or 9, and an upper limit of any of 13, 20, 36, 39, or 40, where any lower limit may be combined with any mathematically-compatible upper limit. In some embodiments, x+z may have a lower limit of any of 1, 1.2, or 2, and an upper limit of any of 4, 6, or 8, where any lower limit may be combined with any mathematically-compatible upper limit. Each of R1 and R1' may represent a functional group independently selected from a primary amine, a secondary amine, a thiol, and a phenolic compound.

In some embodiments, the thermoplastic polymer may be a polyether having the structure represented by formula (II):

(II)

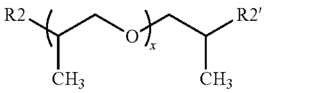

where x is from about 2 to 70. In some embodiments, x may have a lower limit of any of 2, 2.5, or 5, and an upper limit of any of 20, 35, and 70, where any lower limit may be combined with any mathematically-compatible upper limit. In some embodiments, x may be about 2.5, 6.1, or 68. Each of R2 and R2' may represent a functional group independently selected from a primary amine, a secondary amine, a thiol, or a phenolic compound.

The thermoplastic polymer having terminal groups in accordance with one or more embodiments of the present disclosure may have a weight average molecular weight (Mw) in the range of from about 500 to 4,000 Da (daltons). For example, the thermoplastic polymer may have a molecular weight of from about 500 to 4,000 Da. In some embodiments, the molecular weight may have a lower limit of any one of 500, 750, 1,000, 1,500 and 2,000, and an upper limit of any one of 2,500, 2,750, 3,000, 3,500 and 4,000, where any lower limit may be combined with any mathematically-compatible upper limit.

In one or more embodiments, more than one thermoplastic polymer may be used to form the self-healing resin. A combination of thermoplastic polymers may be included in the composition. In one or more embodiments, thermoplastic polymers having different types of terminal functional groups may be included in combination.

In one or more embodiments, a BZ compound may be reacted with the previously-described thermoplastic polymer to form a self-healing resin. The BZ compound generally includes one or two benzoxazine (BZ) moieties. A first benzoxazine moiety is represented by the structure in formula (III):

(III)

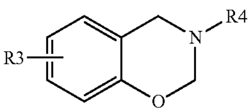

where each of R3 and R4 may represent one or more of a hydrogen atom, a hydrocarbon group, a substituted hydrocarbon group, a functional group, or a second BZ moiety, with the provision that, in some embodiments, one of R3 and R4 is a second BZ moiety, i.e., a di-BZ compound. As used throughout this description, the term "hydrocarbon group" may refer to branched, straight chain, and/or ring-containing hydrocarbon groups, which may be saturated or unsaturated. The hydrocarbon groups may be primary, secondary, and/or tertiary hydrocarbons. As used throughout this description, the term "substituted hydrocarbon group" may refer to a hydrocarbon group (as defined above) where at least one hydrogen atom is replaced with a non-hydrogen group, resulting in a stable compound. Such substituents may be groups selected from, but are not limited to, halo, hydroxyl, alkoxy, oxo, alkanoyl, aryloxy, alkanoyloxy, amino, alkylamino, arylamino, arylalkylamino, disubstituted amines, alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide, substituted sulfonamide, nitro, cyano, carboxy, carbamyl, alkoxycarbonyl, aryl, substituted aryl, guanidine, and heterocyclyl, and mixtures thereof. The functional groups may be groups selected from, but are not limited to, halo, hydroxyl, alkoxy, oxo, amino, amido, thiol, alkylthio, sulfonyl, alkylsulfonyl, sulfonamide, substituted sulfonamide, nitro, cyano, carboxy, carbamyl, alkoxycarbonyl groups, and the like.

In one or more embodiments, the benzoxazine compound may be a di-benzoxazine compound (also referred to as a di-BZ compound), meaning it has two BZ moieties. In one or more embodiments, the di-BZ compound may be a bis-di-BZ. In one or more embodiments, the bis-di-BZ compound units may have a structure represented by formula (IV):

(IV)

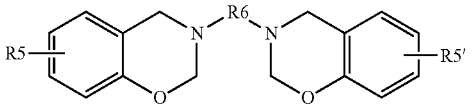

where R5 represents a hydrogen atom, a hydrocarbon group, a substituted hydrocarbon group, or a functional group as discussed above regarding formula (III). R5' may be a group that is the same as, or different from, R5. R6 may represent a hydrocarbon group or a substituted hydrocarbon group. In particular embodiments, R6 may represent an aromatic group selected from, but is not limited to, benzene, bibenzyl, diphenylmethane, naphthalene, anthracene, diphenyl ether, diphenyl sulfone ether, bis(phenoxy) benzene, stilbene, phenanthrene, fluorine, and substituted variants thereof.

In an exemplary embodiment, the di-benzoxazine compound may be a bisamine-type di-benzoxazine having the structure represented by formula (V):

(V)

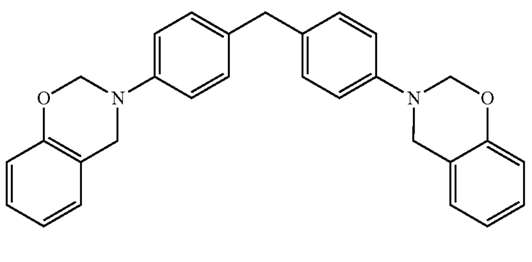

In some embodiments, the di-BZ compound may have a structure represented by formula (VI):

(VI)

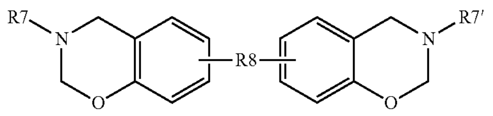

where R7 represents a hydrogen atom, a hydrocarbon group, a substituted hydrocarbon group, or a functional group, as discussed above regarding formula (III). R7' may be a group that is the same as, or different from, R7. R8 may be selected from, but is not limited to, a hydrocarbon, ether, secondary-amino, amido, thioether, sulfonyl, sulfonamide, carbonyl, carbamyl, fluorenyl, alkoxycarbonyl, and mixtures thereof.

In an exemplary embodiment, the di-BZ compound may be a bisphenol-type di-benzoxazine having the structure represented by formula (VII):

(VII)

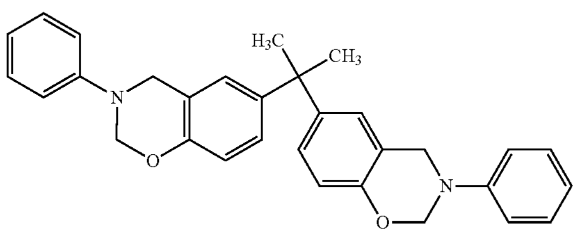

In one or more embodiments, a BZ compound may include ring-opened oligomers having a terminal benzoxazine moiety at one or both end caps. Such ring-opened oligomers are described in International Application Number PCT/IB2021/020018, which is incorporated by reference in its entirety. Ring-opened BZ oligomers may react with the previously-described thermoplastic polymers to form a self-healing resin, provided at least one BZ functionality is present as an end cap.

In one or more embodiments, one or more benzoxazine compounds may be reacted with the previously-described thermoplastic polymer(s) to form a self-healing resin.

In one or more embodiments, the resin composition may be optionally formulated with one or more functionalized compound(s) that are smaller molecules than the thermoplastic polymer. The smaller-functionalized compounds may include functionality such as primary amines, secondary amines, thiols, and/or phenolic compounds. The smaller-functionalized compounds may be provided in the resin composition, so as to allow for tuning of resin properties, including a property such as (but not limited to) thermal stability. The formulation can be performed by a powder dry mixing, melt mixing, or mixing in solution.

From the viewpoint of high reactivity with benzoxazines to form a self-healing resin, diamines may be particularly suitable due to the ring-opening reaction of benzoxazine moieties with diamines. Such diamines may include, but are not limited to, aromatic diamine compounds having a carbon number of 6 to 27, such as bis[4-(3-aminophenoxy)phenyl] sulfone (BAPS-m), bis[4-(4-aminophenoxy)phenyl]sulfone (BAPS-p), 1,4-diaminobenzene (PPD), 1,3-diaminobenzene (MPD), 2,4-diaminotoluene (2,4-TDA), 4,4'-diaminodiphenylmethane (MDA), 4,4'-diaminodiphenylether (ODA), 3,4'-diaminodiphenylether (DPE), 3,3'-dimethyl-4,4'-diaminobiphenyl (TB), 2,2'-dimethyl-4,4'-diaminobiphenyl (m-TB), 2,2'-bis(trifluoromethyl)-4,4'-diaminobiphenyl (TFMB), 3,7-diamino-dimethyldibenzothiophen-5,5-dioxide (TSN), 4,4'-diaminobenzophenone, 3,3'-diaminobenzophenone, 4,4'-bis(4-aminophenyl) sulfide (ASD), 4,4'-diaminodiphenyl sulfone (ASN), 4,4'-diaminobenzanilide (DABA), 1,n-bis(4-aminophenoxy)alkane (n=3, 4, or 5, DAnMG), 1,3-bis(4-aminophenoxy)-2,2-dimethylpropane (DANPG), 1,2-bis[2-(4-aminophenoxy)ethoxy]ethane (DA3EG), 1,5-bis(4-aminophenoxy) pentane (DA5MG), 1,3-bis(4-aminophenoxy) propane (DA3MG), 9,9-bis(4-aminophenyl)fluorene (FDA), 5 (6)-amino-1-(4-aminomethyl)-1,3,3-trimethylindan, 1,4-bis(4-aminophenoxy)benzene (TPE-Q or APB-144), 1,3-bis(4-aminophenoxy) benzene (TPE-R or APB-134 or RODA), 1,3-bis(3-aminophenoxy)benzene (APB or APB-133)), 4,4'-bis(4-aminophenoxy) biphenyl (BAPB), 4,4'-bis(3-aminophenoxy)biphenyl, 2,2-bis(4-aminophenoxyphenyl) propane (BAPP), 2,2-bis[4-(4-aminophenoxy)phenyl] hexafluoropropane (HFBAPP), 3,3'-dicarboxy-4,4'-diaminodiphenylmethane (MB AA), or 4,6-dihydroxy-1,3-phenylenediamine (known as 4,6-diaminoresorcin), 3,3'-dihydroxy-4,4'-diaminobiphenyl (HAB) and 3,3',4,4'-tetraminobiphenyl (TAB); aliphatic or alicyclic diamine compounds having a carbon number of 6 to 24 such as 1,6-hexamethylenediamine (HMD), 1,8-octamethylenediamine (OMDA), 1,9-nonamethylene diamine, 1,12-dodecamethylene diamine (DMDA), 1-amino-3-aminomethyl-3,5,5-trimethylcyclohexane, 4,4'-dicyclohexylmethanediamine and cyclohexanediamine; silicone based diamine compounds such as 1,3-bis(3-aminopropyl)-1,1,3,3-tetramethyldisiloxane and polydimethyl siloxane (PDMS); or combinations thereof. One or more embodiments may use one or more flexible comonomers that include: aromatic compounds (VIII) or (IX), wherein each $R_9$ is independently selected from H, $CH_3$, or halogen, and n is an integer in the range of 1 to 7, and alkyl diamines such as hexamethylene diamine (X), wherein $R_{10}$ is independently selected from H or halogen, and n is an integer in the range of 1 to 15:

(VIII)

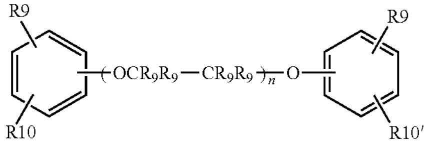

, (IX)

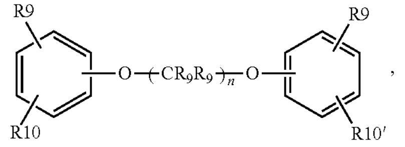

, and (X)

$$R11-(CR_{10}R_{10})_n-R11'$$

Each of R11 and R11' may represent functional group independently selected from primary amines, secondary amines, thiols, or phenolic compounds.

In some embodiments, the self-healing resin composition may include at least one optional additive. The optional additive may include inorganic compounds, organic compounds, thermosetting resins, and combinations thereof. Such additives may increase supramolecular interactions, such as hydrogen bonding, host-guest interactions, π-π interactions, and metal-ligand interactions.

In some embodiments, the optional additives may include an inorganic compound. The inorganic compound may be a metal complex with an halide such as a fluoride, chloride, bromide, iodide, and combinations thereof. Inorganic compounds may be a metal complex of acetate, phosphate, perchlorate, sulfates, triflate, fluoroborate, nitrate, phenolate, and carbonate. Inorganic compounds may include metals of iron, aluminum, zinc, manganese, cobalt, copper, nickel, magnesium, calcium, and combinations thereof. In some embodiments, the inorganic compound may be $AlCl_3$, $FeCl_3$, $ZnCl_2$, and combinations thereof.

An inorganic compound may be included in an amount ranging from 1 to 25 phr. In some embodiments, the self-healing resin may include an inorganic compound in a range having a lower limit of one of 1, 3, 5, or 8 phr (parts per hundred resin) of optional additives and an upper limit of one of 10, 15, 20 and 25 phr, where any lower limit may be paired with any mathematically-compatible upper limit.

In one or more embodiments, the optional additives may include an organic compound. In particular embodiments, the organic compound may include a carboxylic acid compound, phenolic compound, and combinations thereof. In some embodiments, the organic compounds may be benzoic acid, hydroxybenzoic acid, salicylic acid, 2,4-hexadienoic acid, naphthoic acid, hydroxynaphthoic acid, 4,4'-biphenol, Bisphenol-A, Bisphenol-F, Bisphenol-S, 4,4'-dihydroxybenzophenone.

An organic compound may be included in an amount ranging from 1 to 25 phr. In some embodiments, the self-healing resin may include an organic compound in a range having a lower limit of one of 1, 3, 5, or 8 phr (parts per hundred resin) of optional additives and an upper limit of one of 10, 15, 20 and 25 phr, where any lower limit may be paired with any mathematically-compatible upper limit.

In one or more embodiments, the optional additive may include thermosetting resins such as epoxy, bismaleimide, and/or cyanate compounds. Commonly-used bismaleimides and cyanate ester compounds known in the art may be suitable. Examples of epoxy compounds may include, but are not limited to, cycloaliphatic epoxy compound, aromatic phenyl-based epoxy compound, and polyglycidyl epoxy compound, such as polyglycidyl ether or polyglycidyl ester.

A thermosetting resin may be included in an amount ranging from 1 to 15 phr. In some embodiments, the self-healing resin may include an epoxy compound in a range having a lower limit of one of 1, 2, 3, 5, or 7 phr (parts per hundred resin) of optional additives and an upper limit of one of 8, 10, 12, and 15 phr, where any lower limit may be paired with any mathematically-compatible upper limit.

Any of the above-described optional additives may be used alone or in combination.

In one or more embodiments, the self-healing resin composition may be obtained through a melt polymerization process. In some embodiments, melt polymerization may be used for synthesis of the self-healing resin composition, as there is no solvent required and the reaction time is greatly reduced as compared to solution-phase polymerization. Furthermore, melt polymerization may be advantageous, as purification may not be required once the polymerization is complete. In one or more embodiments, melt polymerization may include ring-opening of the BZ compounds to form the self-healing resin composition. In such embodiments, the BZ compounds undergo ring-opening by reaction with terminal amine groups of the thermoplastic polymer.

The melt polymerization of one or more embodiments may have a temperature ranging from about 50 to 130° C. In some embodiments, the melt polymerization may have a temperature of a range having a lower limit of one of 50, 55, 60, 65, 70, 75, 80, and 90° C., and an upper limit of one of 95, 100, 105, 110, 115, 120, 125 and 130° C., where any lower limit may be paired with any mathematically-compatible upper limit.

The melt polymerization of one or more embodiments may be performed for a total time ranging from about 1 to 10 hours. In some embodiments, the melt polymerization may be performed for a total time of a range having a lower limit of one of 1, 1.5, 2, 2.5, 3, 3.5, 4, 4.5, and 5 hours and an upper limit of one of 5.5, 6, 6.5, 7, 7.5, 8, 8.5, 9, 9.5 and hours, where any lower limit may be paired with any mathematically-compatible upper limit.

In one or more embodiments, the melt polymerization may include the thermoplastic polymer and the BZ compound in a molar ratio of 1:10 to 10:1 (thermoplastic polymer to BZ compound). In some embodiments, the molar ratio of the thermoplastic polymer and the BZ compound may be of a range having a lower limit of one of 1:10, 1:8, 1:5, 1:3 1:2, 1:1, and 2:1 and an upper limit of one of 1:2, 1:1, 2:1, 3:1, 8:1, and 10:1, where any lower limit may be paired with any mathematically-compatible upper limit.

In one or more embodiments, the melt polymerization may include an amount of optional additives in an amount ranging from 1 to 50 phr (parts per hundred resin). In some embodiments, the melt polymerization may include an amount of optional additives in a range having a lower limit of one of 1, 5, 10, 15, 20, and 25 phr and an upper limit of one of 30, 35, 40, 45, and 50 phr, where any lower limit may be paired with any mathematically-compatible upper limit.

The melt polymerization of one or more embodiments may comprise mixing the raw materials (e.g., the thermoplastic polymer(s), the BZ compound(s), and other components of the composition as previously described) by solvent at a high solid content or melt mixing. In one or more embodiments, the melt polymerization involves an application of heat that may be performed using (but is not limited to) an oven, an extruder, a hot plate, an oil bath, a hot press machine, an autoclave, and so on. In one or more embodiments, the melt polymerization may be performed under (but is not limited to) standard atmospheric pressure, vacuum, and an inert atmosphere, such as argon or nitrogen gas. In one or more embodiments, the melt polymerization by application of heat may be performed under a flow of (but is not limited to) air or under an inert gas, such as argon or nitrogen.

A solution-based synthetic method may also provide the same self-healing resin composition. However, a solution method highly depends on the solid content of the raw materials for polymerization and may require a much longer reaction time. In solution-based polymerization, the solid content of the raw materials should be sufficiently high to allow the reaction to proceed. In one or more embodiments, the solid content of the raw materials in solvent may be in an amount ranging from 25 to 90 weight percent. In some embodiments, the solid content in solvent may include a lower limit of one of 25, 35, 40, 45, and 50 and an upper limit of one of 55, 60, 65, 70, 75, 80, 85 and 90, where any lower limit may be paired with any mathematically-compatible upper limit.

The self-healing resins in accordance with one or more embodiments of the present disclosure may include units derived from the thermoplastic polymer in an amount ranging from 50 to 95 wt. % (weight percent). In some embodiments, the self-healing resins may contain units derived from the thermoplastic polymer in an amount ranging from a lower limit of one of 50, 55, 60, and 65 wt. % and an upper limit of one of 70, 75, 85, 90, and 95 wt. %, where any lower limit may be paired with any mathematically-compatible upper limit.

The self-healing resins in accordance with one or more embodiments of the present disclosure may include units derived from the BZ compound in an amount ranging from to 50 wt. %. In some embodiments, the self-healing resins may contain units derived from the BZ compound in an amount of a range having a lower limit of one of 5, 10, 15, 25, and 30 wt. % and an upper limit of one of 35, 40, 45 and 50 wt. %, where any lower limit may be paired with any mathematically-compatible upper limit.

Self-healing resins in accordance with one or more embodiments of the present disclosure may include a total amount of optional additives in an amount ranging from 1 to 50 phr. In some embodiments, the self-healing resin may include an amount of optional additives in a range having a lower limit of one of 1, 5, 10, 15, 20, and 25 phr and an upper limit of one of 30, 35, 40, 45, and 50 phr, where any lower limit may be paired with any mathematically-compatible upper limit.

Self-healing resins in accordance with one or more embodiments of the present disclosure may have an unreacted BZ compound content from about 5 to 40 wt. %. In some embodiments, the self-healing resin may include an unreacted BZ compound content having a lower limit of one of 5, 10 15, and 20 wt. % and an upper limit of one of 30, 35 and 40 wt. %, where any lower limit may be paired with any mathematically-compatible upper limit.

Self-healing resins in accordance with one or more embodiments of the present disclosure may have a weight average molecular weight (Mw) of a range from about 5 to 100 kilodaltons (kDa). In some embodiments, the Mw of the self-healing resin may be of a range having a lower limit of one of 5, 10, 20, 40 and 50 kDa and an upper limit of one of 60, 70, 80, 90, 100 kDa, where any lower limit may be paired with any mathematically-compatible upper limit.

Figure 1B:
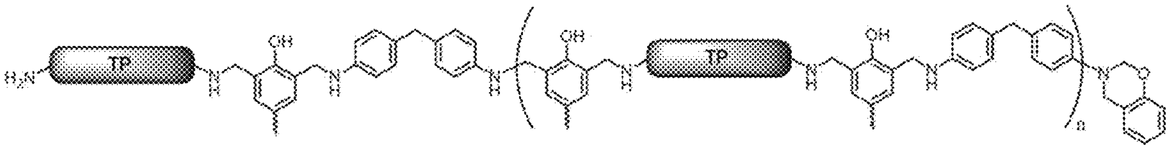
FIG. 1B is an exemplary self-healing resin according to one or more embodiments of the present disclosure.

Polymers formed via the polymerization of the previously described self-healing resins may include the previously described terminal functional groups, such as a benzoxazine moiety, at both end caps of the polymer in one or more embodiments. Examples of such a structure are shown in FIGS. 1A and 1B. Polymers formed via the polymerization of the previously described self-healing resins may include the previously described terminal functional groups, such as an amine moiety, at both end caps in one or more embodiments. An example of such a structure is shown in FIG. 1C.

Figure 1C:
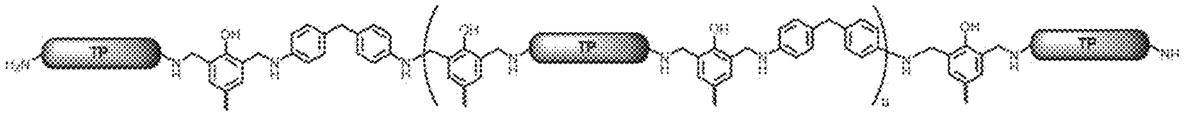
FIG. 1C is an exemplary self-healing resin according to one or more embodiments of the present disclosure.

An exemplary self-healing resin in accordance with one or more embodiments of the present disclosure may have a structure shown in FIGS. 1A, 1B and 1C. The portion labeled "TP" represents the thermoplastic polymer described above.

As shown in FIGS. 1A, 1B and 1C the BZ moieties have been ring-opened by reaction with terminal amine groups. Further, after having undergone a ring-opening reaction, the units from the BZ compounds contribute phenolic and secondary amine functionalities to the overall polymer structure. Such functionality may contribute to hydrogen bonding within the polymer structure and improve self-healing properties.

Self-healing resins in accordance with one or more embodiments of the present disclosure may be cured in order to form an article, such as a film or coating. Self-healing resins may be cured in a variety of manners, which may include (but are not limited to) a cure cycle, solution casting, hot-melt pressing, and the like, including by external stimuli selected from heat, ultraviolet irradiation, microwave irradiation, moisture, and the like. In certain embodiments, the self-healing resins may be cured at a curing temperature of from about 30 to 150° C. and for a curing time of from 1 hour to 7 days. Curing time and temperature may be adjusted appropriately based upon the self-healing resin composition.

Self-healing resins in accordance with one or more embodiments of the present disclosure may have a variety of uses such as in a composite or as a coating. In a composite, the self-healing resins may be used as a primary matrix polymer or as an additive in a composite having a distinct matrix polymer. When used as an additive, self-healing resins may be present in an amount of up to 50 wt. %. Further, in one or more embodiments, when the self-healing resins are used as an additive, the primary matrix polymer may include (but is not limited to) epoxy, benzoxazine, polyamide, polypropylene, polysulfone, or polyphenylene sulfide.

In one or more embodiments, the self-healing resin may be formulated as compositions with additives, tougheners made from thermoplastic resins, thermosetting resins, inorganic compounds, organic compounds, and so on. The formulation can be performed by powder dry mixing, melt mixing, or mixing in solution. The shapes of both the additives and the tougheners may involve a particle that includes (but is not limited to) a plate or a fiber, for example. One or more additives, tougheners, and fibers may be formulated together with the curable composition. For example, one or more thermoplastic resins can be formulated together with the self-healing resin composition. Such thermoplastic resin may include (but is not limited to) poly(ether ketone), poly(ether ether ketone), poly(phenylene sulfide), poly(ether imide), polycarbonate, polysulfone, and so on. In another example, one or more thermosetting resins can be formulated together with the curable composition and thermally co-cured. Such thermosetting resin may include (but is not limited to) epoxy, benzoxazine, bismaleimide, cyanate ester, and so on. It is also envisioned that the thermoplastic and the thermosetting resins can be used together in the self-healing resin composition of the present disclosure. In one or more embodiments, inorganic compounds, organic compounds, and a combination thereof may be used with the self-healing resin composition to lower the curing temperature. For example, the organic compound may involve a functional group including (but not limited to) an amino group, imidazole group, carboxylic group, hydroxy group, sulfonyl group, and so on.

Self-healing resins in accordance with one or more embodiments of the present disclosure may be useful in a number of applications, including (but not limited to) aerospace, automotive, and marine applications, to form structural composites. Ruptures in structural components in aerospace, automotive, or marine applications may result in failure of the components, thus, self-healing properties may be particularly useful in such components. However, the presently-described resins are not limited to such articles.

In the formation of a coating or adhesive layer, application of the formulated coating may be made via conventional methods, such as spraying, roller coating, dip coating, etc. Then, the coated system may be cured, such as by baking.

Articles made from the self-healing resins in accordance with one or more embodiments of the present disclosure may exhibit self-healing properties. In particular embodiments, self-healing resins may repair ruptures at room temperature or elevated temperatures without the need for foreign additives or fillers. As used herein, a rupture may be a cut, crack, puncture, scratch, or other similar physical deformation in a resin. As used herein, repair means to at least partially reform a structure where a rupture was previously present.

In one or more embodiments, articles having a rupture may be self-healed by maintaining the article at a predetermined temperature for a predetermined time such that the rupture is repaired. In one or more embodiments, the self-healing temperature may be in a range of from about ambient temperature to 175° C. In some embodiments, the self-healing temperature may be of a range having a lower limit of any of ambient temperature, 30, 50, 60 and 90° C. and an upper limit of any of 100, 125, 150, and 175° C., where any lower limit may be paired with any mathematically-compatible upper limit. In one or more embodiments, the self-healing time may be in a range from about 30 minutes to several days. In some embodiments, the self-healing time may be in a range having a lower limit of any of 0.5, 1.0, 1.5, 2.0, 2.5, 3, 5, or 10 hours and an upper limit of any of 10, 7, 5, 2 and 1 days, where any lower limit may be paired with any mathematically-compatible upper limit. If a higher self-healing temperature is used, generally a shorter self-healing time is required.

Without wishing to be bound by any particular mechanism or theory, it is believed that a high dynamic mobility and supramolecular interactions in the polymer structure may contribute to superior self-healing properties. As explained above, the self-healing resin may include hydrogen bonding interactions from the phenolic and secondary amine groups on the ring-opened di-BZ units. Hydrogen bonding may also be provided from the thermoplastic polymer units. The use of additives such as metal complexes may provide metal-ligand interactions in the polymer structure, improving the self-healing properties. Epoxy may be a useful additive for self-healing properties because it may undergo ring opening reactions with the phenolic groups present in the di-BZ units in the polymer. Such ring-opening reactions generate alkyl hydroxyls, which may also contribute to hydrogen bonding within the polymer. However, the use of excessive amounts of epoxy may result in cross-linking with phenolic groups, which may decrease optimal hydrogen bonding within the polymer structure and reduce self-healing properties. A combination of epoxy and metal complexes may provide improved self-healing by favorable metal-ligand interactions between the metal ion and phenolic groups in the polymer and may prevent the unfavorable cross-linking of epoxy with phenol. Additives such as phenolic compounds and carboxylic acids may also increase hydrogen bonding in the structure and contribute to self-healing properties.

EXAMPLES

The following examples are merely illustrative and should not be interpreted as limiting the scope of the present disclosure.

Materials

A bisamine-type benzoxazine (product name: P-d) was obtained from Shikoku Chemicals Corporation. O,O'-Bis(2-aminopropyl) polypropylene glycol-block-polyethylene glycol-block-polypropylene glycol (product name: Jeffamine® ED-2003) was purchased from Sigma-Aldrich. Aluminum chloride hexahydrate, $[Al(H_2O)_6]Cl_3$ and methanol were obtained from VWR. THF and 1,3-dioxolane were purchased from Beantown Chemicals. Bisphenol-A diglycidyl ether epoxy resin (product name: Epon® Resin 828) was obtained from Polysciences, Inc.

Synthesis of PE-BZ (Example 1)

5.00 g of P-d (11.5 mmol) and 24.17 g (12.1 mmol) of Jeffamine ED-2003 were added to a flask and stirred at 90° C. for about 4 hours. An increase in the viscosity of the mixture was observed as the reaction progressed. The resultant product was cooled to room temperature and refrigerated to prevent undesired cross-linking. The resultant product is referred to as PE-BZ. This resin has a melting point of about 30° C.

Synthesis of PE-BZ+Epoxy and Metal Complex (Example 2)

Stock solutions of reaction components were prepared via the following methods. 5.525 g of PE-BZ was dissolved in 15 mL of 1,3-dioxolane by stirring over mild heat for 2 hours. 325 mg of Epon® Resin 828 (referred to hereafter as "epoxy") was dissolved in 6 mL THF by stirring for 60 minutes. 182 mg of $AlCl_3$ was dissolved in 2 mL of methanol by stirring for 60 minutes.

PE-BZ as described in Example 1 was mixed with a predetermined amount of epoxy stock solution, and optionally $AlCl_3$. The quantities of each component are listed below in Table 1.

TABLE 1

| | PE-BZ | Epoxy | $AlCl_3$ |
|---|---|---|---|
| Sample 1 | 1.9 g | N/A | N/A |
| Sample 2 | 1.9 g | 0.1 g (5 phr) | N/A |
| Sample 3 | 1.8 g | 0.1 g (5 phr) | 0.182 g (10 phr) |

First, the PE-BZ solution was stirred vigorously as the desired amount of epoxy solution was added. If applicable, the $AlCl_3$ solution was then added slowly under vigorous stirring. After adding all the metal complex solution, the mixture was stirred for about one hour.

Film Preparation (Example 3)

Films were prepared from the samples of Examples 1 and 2. PE-BZ films (i.e., Sample 1) were prepared by curing the PE-BZ in air at 200° C. for 30 minutes. Films of Samples 2 and 3 were prepared by curing in air for the following temperatures and times: 30° C. for 2 days, followed by 60° C. for 1 hour, followed by 90° C. for 5 hours, followed by 120° C. for 1.5 hours. Film of Sample 2 was additionally subjected to 200° C. for 30 minutes to ring-open residual di-BZ. This treatment is not needed for Sample 3, as $AlCl_3$ acts as a catalyst at lower temperature.

Elevated Temperature Self-Healing Tests (Example 4)

Films of samples 1-3 were prepared according to Example 3 and cut into approximately 1 cm×1 cm pieces. Then, cuts in the films were made with a razor blade in two locations. The films were then heated to 125° C. or 150° C. and held at that temperature for 1-2 hours. Macrophotographs were taken before and after the heating.

Room Temperature Self-Healing Tests (Example 5)

A film of sample 3 was prepared according to Example 3 and cut into a piece approximately 1 cm×1 cm. The film was then cut so as to make a complete cut, separating the film into two pieces. The pieces were placed in physical contact with each other, and a small weight was placed on top of the film to ensure even contact. The film was left for 5 days. Photographs and macrographs were taken before and after the 5 days.

Similarly, a 1 cm×0.25 cm film strip of Sample 1 was introduced with two complete cuts along its length. The pieces were placed in physical contact with each other, and a small weight was placed on top of the film to ensure even contact. The film was left for 2.5 days. Macrographs were taken after 2.5 days.

Thermal Stability (Example 5)

The thermal stability of the PE-BZ resin made according to Example 1 was tested by heating the resin to 200° C. in air and measuring weight loss after 2 hours at 200° C. Less than 1 wt. % weight loss was observed for the PE-BZ resin. As a comparison, the same thermal stability test was performed on the Jeffamine® ED-2003 polymer. A weight loss of 14 wt. % was observed after 2 hours at 200° C. in air, indicating an increase in thermal stability of the PE-BZ resin as compared to the Jeffamine® ED-2003 polymer.

Results and Discussion

Figures 2A, 2B:
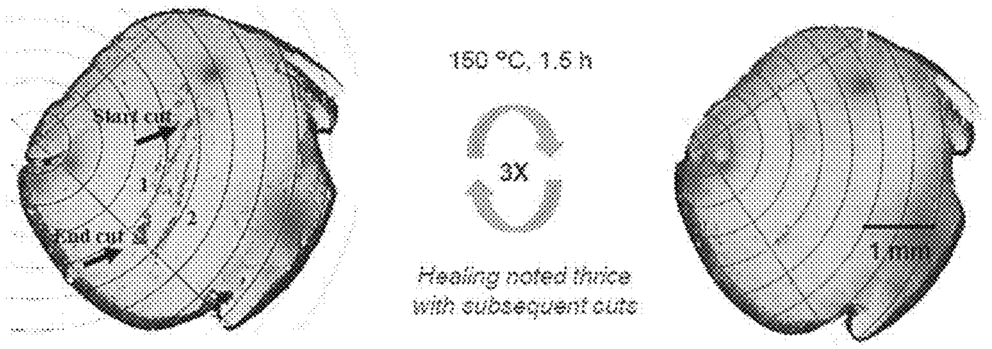
FIG. 2A is a photomacrograph of a polymer with cuts according to one or more embodiments of the present disclosure.
FIG. 2B is a photomacrograph of a polymer that has undergone self-healing according to one or more embodiments of the present disclosure.

FIG. 2A shows sample 1 with cuts according to Example 4. FIG. 2B shows sample 1 after having been heated to 150° C. for 1.5 hours. As shown, the cuts in the film are no longer visible after heating, indicating that the film has healed nearly completely. Notably, this film was cut and self-healed three subsequent times. Without wishing to be bound by a particular mechanism or theory, it is believed that the supramolecular interactions present in PE-BZ (e.g., hydrogen bonding between phenolic groups and the ether polymer backbone), along with sufficient molecular mobility, allow for the polymer to self-heal.

FIG. 3A shows sample 2 with cuts according to Example 4. FIG. 3B shows sample 2 after having been heated to 150° C. for 2 hours. There appears to be some healing in this sample, but it is not as significant as the healing in sample 1. Without wishing to be bound by a particular mechanism or theory, it is believed that the reaction of epoxy with the phenolic groups in the PE-BZ creates cross-linking and reduces the molecular mobility, as well as the favorable hydrogen bonding characteristics within the PE-BZ structure, and thus may reduce its self-healing properties.

FIG. 4A shows sample 3 with cuts according to Example 4. FIG. 4B shows sample 3 after having been heated to 125° C. for 1 hour. This sample appears to have undergone nearly complete healing in a relatively short time, and at a relatively low temperature. Without wishing to be bound by a particular mechanism or theory, it is believed that the $AlCl_3$ may prevent the cross-linking of phenol with epoxy and provide metal-ligand interactions resulting in better self-healing.

FIG. 5A is a photograph of sample 3 with cuts according to Example 5. FIG. 5B is a photograph of the same sample after about 5 days at room temperature. As shown, the sample shows nearly complete self-healing at room temperature.

FIG. 6A is a macrograph of the sample shown in FIG. 5A. The complete cut in the film can be seen. FIGS. 6B and 6C are macrographs showing the sample in FIG. 5B. As shown, the sample appears to have self-healed nearly completely at room temperature.

FIG. 7A shows sample 1 according to Example 5 with cuts in the process of healing. FIGS. 7B and 7C are macrographs of the cut healed area in FIG. 7A. The healing process after 2.5 days is observed. Where once were complete cuts, the film has come together by self-healing at room temperature.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words ‘means for’ together with an associated function.

What is claimed is:

1. A self-healing resin composition, comprising:

a polymer formed from a reaction between (a) a thermoplastic polymer with terminal functional groups and (b) a benzoxazine compound, wherein the terminal functional groups are selected from the group consisting of primary amines, secondary amines, thiols, phenols, and combinations thereof; and a thermosetting resin selected from the group consisting of an epoxy resin, a bismaleimide resin, a cyanate ester resin, and combinations thereof, wherein the self-healing resin composition comprises 1 to 15 phr of the thermosetting resin relative to the polymer.

2. The self-healing resin composition of claim 1, wherein the thermoplastic polymer is a polyether having a structure represented by formula (I):

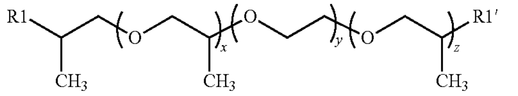

(I)

wherein y is from 1 to 40, x+z is from 1 to 8, and R1 and R1' are independently selected from a primary amine, a secondary amine, a thiol, and a phenol.

3. The self-healing resin composition of claim 1, wherein the thermoplastic polymer is a polyether having a structure represented by formula (II):

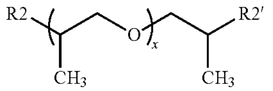

(II)

wherein x is from 2 to 70, and R2 and R2' are independently selected from a primary amine, a secondary amine, a thiol, or a phenol.

4. The self-healing resin composition of claim 1, wherein the thermoplastic polymer has a weight average molecular weight (Mw) of from 500 to 4,000 Da (daltons).

5. The self-healing resin composition of claim 1, wherein the benzoxazine compound is a benzoxazine having a structure represented by formula (V):

(V)

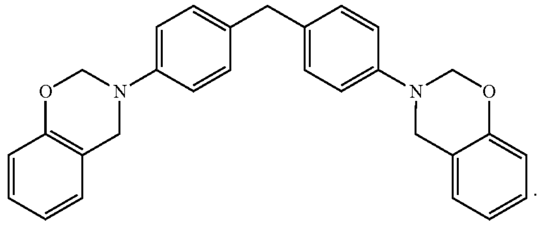

6. The self-healing resin composition of claim 1, wherein the benzoxazine compound is a benzoxazine having a structure represented by formula (VII):

(VII)

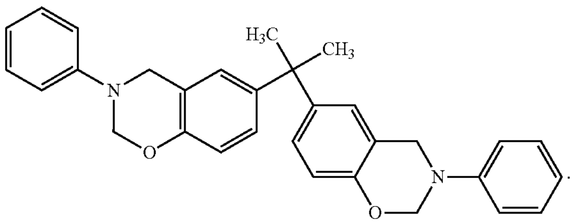

7. The self-healing resin composition of claim 1, further comprising an inorganic compound selected from the group consisting of $AlCl_3$, $FeCl_3$, $ZnCl_2$, and combinations thereof.

8. The self-healing resin composition of claim 7, comprising from 1 to 25 phr of the inorganic compound.

9. The self-healing resin composition of claim 1, further comprising an aromatic diamine.

10. The self-healing resin composition of claim 1, wherein the polymer comprises from 50 to 95 wt. % of units derived from the thermoplastic polymer.

11. The self-healing resin composition of claim 1, wherein the polymer comprises from 5 to 50 wt. % of units derived from the benzoxazine compound.

12. A method of forming a self-healing resin composition, comprising:

reacting by melt polymerization the following: (a) a benzoxazine compound and (b) a thermoplastic polymer with terminal functional groups to form a first polymer, wherein the terminal functional groups are selected from the group consisting of primary amines, secondary amines, thiols, phenol, and combinations thereof, and blending a thermosetting resin selected from the group consisting of an epoxy resin, a bismaleimide resin, a cyanate ester resin, and combinations thereof with the first polymer, wherein the self-healing resin composition comprises 1 to 15 phr of the thermosetting resin relative to the first polymer.

13. The method of claim 12, wherein the melt polymerization is at a temperature ranging from 50 to 130° C.

14. The method of claim 12, wherein the melt polymerization has a time ranging from 1 to 10 hours.

15. The method of claim 12, wherein the thermoplastic polymer and the benzoxazine compound are present in a molar ratio of from 1:10 to 10:1.

* * * * *